Dec. 3, 1935.  A. H. OELKERS  2,023,091
ROLLER BEARING ASSEMBLY
Filed Nov. 25, 1929
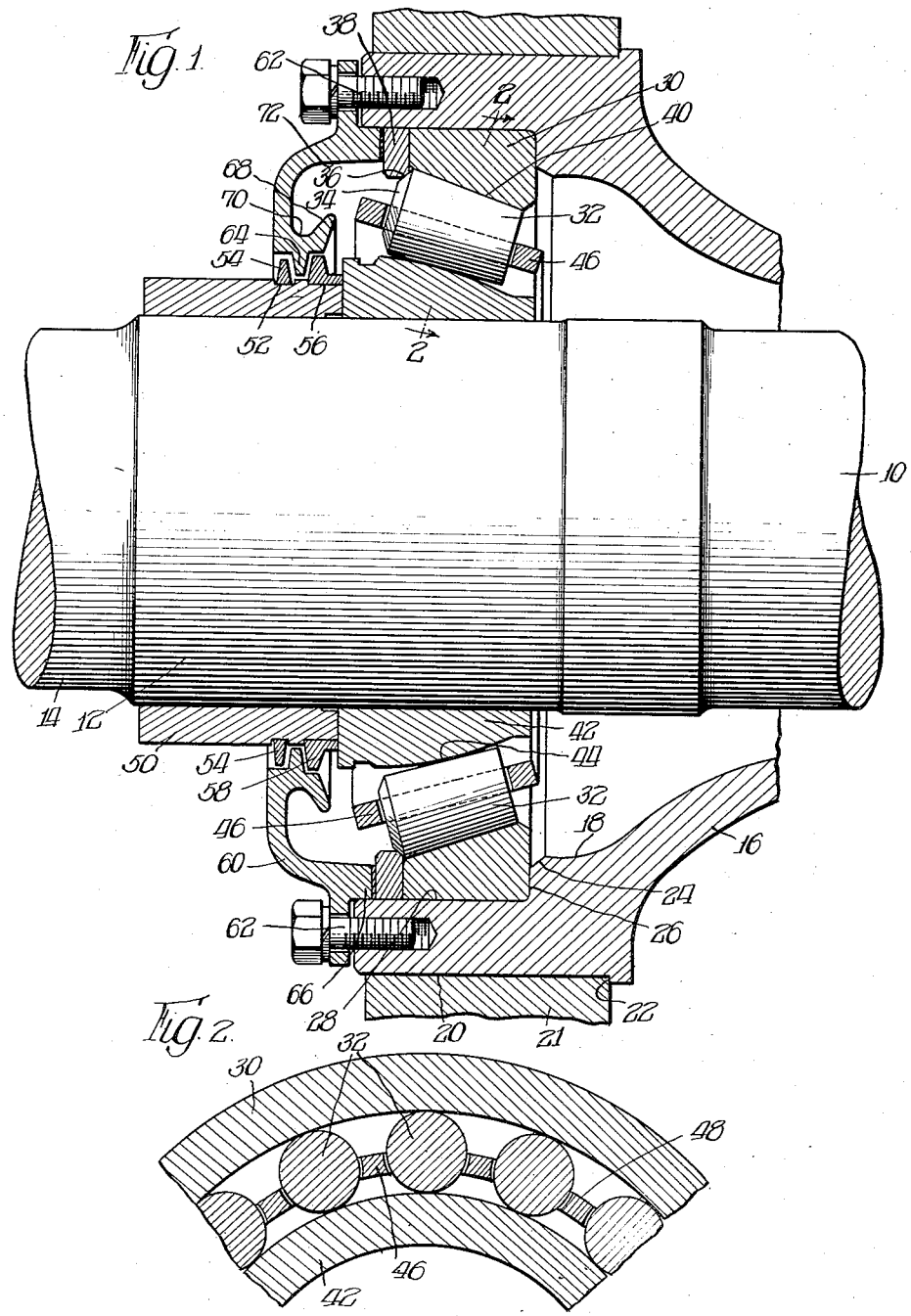

Patented Dec. 3, 1935

2,023,091

UNITED STATES PATENT OFFICE 2,023,091

ROLLER BEARING ASSEMBLY

Alfred H. Oelkers, Chicago, Ill., assignor to American Steel Foundries, Chicago, Ill., a corporation of New Jersey Application November 25, 1929, Serial No. 409,495

42 Claims. (Cl. 295—36)

This invention pertains to roller bearing units, and more particularly to the arrangement of the structure of such assemblies for railway rolling stock whereby the full load may be properly transmitted through the bearings and whereby the entrance of foreign matter into the bearing housing is effectively prevented.

During the development of roller bearing units, it has been found that special details of construction are necessary for the bearings to properly function in transmitting different loads. It has also been found that in order to have the bearings properly function over a long period of time, the bearings must be kept clean, thoroughly lubricated, and moisture must be excluded. Grit and dirt of course will cause slight wearing away of the surfaces of the bearings, rendering the same inefficient. Moisture interferes with the proper lubrication of the bearings and causes or tends to cause corrosion. Some attention must also be paid to providing a bearing which can be easily and effectively assembled with parts of the roller bearing units, and to this end, it has been desirable to provide a bearing which is partially self-contained.

In a self-contained bearing, where a support is provided for the bearings under certain conditions, the support must be of such character that it will not interfere with the anti-friction properties of the bearings. All anti-friction bearings tend to be frictional under some loading, working or stressing of parts of the assembly, and it is therefore an object of this invention to provide a roller bearing assembly which is inexpensive to make and maintain, and as nearly as possible functions as an anti-friction bearing under all conditions of operation.

Another object is to provide an anti-friction bearing assembly wherein a part of the bearing may be assembled with a part of the axle assembly, yet one in which the anti-friction properties of the bearing are not seriously impaired.

Still another object is to provide a construction of wheel and axle assembly which will positively prevent any tendency of the entrance of foreign substance to the roller bearing assembly, and one in which the parts are so proportioned that lubricant is positively prevented from being drained no matter what the condition of operation of the bearing.

A further object is to provide a construction which is readily applicable to existing roller bearing units, and one which is easily applied and serves to aid in maintaining the bearings in operative position.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a fragmentary sectional elevation through one end of a wheel of an anti-friction wheel and axle assembly embodying the invention; and Figure 2 is a fragmentary sectional elevation through the roller bearing and cage construction, the same being taken substantially in the plane as indicated by the line 2—2 of Figure 1.

In the roller bearing construction illustrated, only a portion of one bearing assembly will be described, though it is understood that the construction is the same at both ends of the axles. The inner normally non-rotatable axle 10 is provided with a cylindrical bearing receiving portion 12 and a cylindrical end bearing portion 14 which is adapted to extend within the usual standard journal box and cooperate with the brasses and wedges therein in the well-known manner. The outer rotatable axle 16 is flared at its ends to form a lubricant recess 18 and terminates in a wheel receiving portion 20, the wheel 21 being positioned thereon by means of a shoulder 22. Only a portion of said wheel is shown at 21, but it is of course understood that the wheel is of the same general character and seats on the portion 20 as shown in Patent No. 2,000,534, May 7, 1935, wherein a railway wheel of the flanged construction is illustrated. The lubricant recess is beveled as at 24, sloping into a shoulder 26 defining the inner cylindrical cup receiving portion 28. The bearing cup 30 is disposed within the portion 28 and limited by the shoulder 26 in its inward movement, and, as shown, the bearing surface of the cup or outer race on which the roller travels is substantially of the shape of a right frustum of a cone having the same angle as the roller, and the roller bearings are assembled therewith. The rollers 32 are in the shape of a frustum of a right cone with the large end of the rollers being disposed outwardly of the assembly, the axis of the rollers sloping outwardly. The large end of each roller is provided with a smaller frusto-conical portion 34, the surface of which contacts against a complementary surface 36 provided on a guiding shoulder or cup 38 which may either be made of a separate piece from the bearing cup or may be made integrally therewith. The roller of course carries the load against the bearing cup on the large conical surface 40, and the roller is held in position lengthwise by rolling on the bearing cup and is guided by the guiding cup contacting the end of the roller.

The bearing cone or inner race ring 42 on which the roller travels is nominally in the shape of a frustum of a right cone with the exception that the elements of surface 44 contacting the roller are slightly curved, i. e., the surface of the cone is of compound curvature. The diameter of this cone at a point directly opposite the large end of the roller is slightly smaller than will contact the cone at this point when there is no load on the axle assembly. The diameter of the bearing cone at a point directly opposite the small end of the roller is likewise reduced and the deviation from a right cone presented by the surface of the roller bearing cone is made just sufficient to prevent concentrating the load between the cup surface and the roller at either end of the roller under the various loads carried by the axle. In other words, in assembling the roller bearing unit under no load, the roller bearing contacts the bearing cone at substantially midpoint between the ends of the roller, the clearance between the large end of the roller and the cone being slightly greater than the clearance between the small end of the roller and the cone. When the assembly is loaded and the inner axle deflects, the elements taken in vertical planes through the cones and rollers tend to contact over a line rather than at a point due to the deflection of the elements of the cone and bearing. While the elements forming the bearing surface of the cone may be portions of circumferences of circles, still no two elements are formed on the same circumference. The surface of the cone, then, is such that when the axle is under its maximum bending moment, or when the end of the axle is deflected downwardly the maximum amount, the end of the line of contact between the cone surface and the roller will be adjacent the large and small ends of the roller due to the tendency of the elements of the cone and bearing to straighten or coincide.

The bearing cage 46 is used to guide the lateral position of the rollers and is of a shape and size so that its outer surface 48 coincides with the pitch diameter of the roller bearing assembly. The roller cage thus extends inwardly, forming ridges between each pair of rollers inside of the roller pitch circle. The bearing cone is maintained in position by means of the sleeve or shrink ring or collar 50, shrunk or press fitted on the bearing surface 12. The shrink collar 50 is provided with a groove 52 for accommodating the upstanding baffle ring 54 provided therein, and the shrink collar is also provided with a groove 56 for the reception of the inner baffle ring 58 slightly spaced from the outer baffle ring 54. The cover plate 60 is secured by means of the bolts 62 to the outer axle and has a web which extends inwardly toward the shrink collar. The cover plate is provided with an inwardly extending flanged portion 64 spaced from the outside and inside surfaces of the cover plate which is adapted to extend between the inner and outer baffle rings. The cover plate is provided with an inwardly extending portion 66 adapted to position the guiding cup 38 and is also provided with an out-turned flanged portion 68 adjacent the inner edge of the web forming an oil groove 70 for preventing loss of lubricant. The baffle ring construction functions in a manner as described in application Serial No. 409,494, filed November 25, 1929, Patent No. 2,003,605, June 4, 1935, and with the cup portion 72 forms means for insuring lubrication of the bearings under all conditions of operation. When rotation of the assemblies is arrested, any oil disposed outwardly by the centrifugal action will not be lost through the cover plate due to channel 70, as the oil will be caught by the channel 70 and will be directed around the axle down into the lower part of the lubricant recess. The bearing may be assembled by placing the rollers in the perforations of the cage from the outer side of the cage, and then placing the assembly in the bearing cup. The guiding cup may be placed against the bearing cup holding the roller and cage assembly in position. With this construction, then, it is possible to assemble the units thus far, not applying the inner axle and the bearing cone until the units are desired to be put into use. At that time, the cones may be brought into position for proper adjustment on the inner axle as is usual.

In operation, the centrifugal action of the rollers tends to move the same outward of the assembly whereby in the usual construction the rollers would tend to bind against the ridges between the perforations of the bearing cage, but with the cage disposed in the manner described, the rollers will simply tend to move away from the cages, and there will be no binding action. Also, by disposing the rollers in such manner and in providing the assembly as described, the frictional bearing between the roller and the outer race ring or the guiding cup is reduced to a minimum.

It will thus be seen that a very advantageous structure is provided, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a railway wheel and axle assembly, the combination of an outer rotary axle having an enlarged wheel hub portion and a bearing recess, said hub portion being adapted to accommodate a railway flanged wheel, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, a shrink ring mounted on said inner axle for positioning said anti-friction bearings, a cover plate mounted on said outer axle and extending toward said shrink ring, said shrink ring having baffle rings thereon embracing a portion of said cover plate whereby foreign matter is excluded from said anti-friction bearings.

2. In a railway wheel and axle assembly, the combination of an outer rotary axle having an enlarged wheel hub portion and a bearing recess, said hub-portion being adapted to accommodate a railway flanged wheel, said axle having a lubricant recess communicating with said bearing recess partially within said enlarged hub portion, an inner non-rotatable axle extending through said outer axle and having a bearing portion thereon, anti-friction bearings mounted between said axles and in said bearing recess, said bearings having a cone mounted on said inner axle, a shrink ring mounted on said inner axle for positioning said anti-friction bearings, a cover plate mounted on said outer axle and extending toward said shrink ring, said shrink ring having a plurality of baffle rings thereon, said cover plate having a portion interfitting with said baffle rings whereby foreign matter is excluded from said anti-friction bearings.

3. In a wheel and axle assembly, the combination of an outer rotary axle having an enlarged wheel hub portion and a bearing recess, said axle having a lubricant recess communicating with said bearing recess and partially within said enlarged hub portion, an inner non-rotatable axle extending through said outer axle and having a bearing portion thereon, anti-friction bearings mounted between said axles and in said bearing recess, said bearings having a cone mounted on said inner axle and a cup mounted in said outer axle, a shrink ring mounted on said inner axle for positioning said anti-friction bearings, a cover plate mounted on said outer axle and having means cooperating with said cup to position the same, said cover plate extending toward said shrink ring, said shrink ring having baffle rings thereon overlapping a portion of said cover plate to exclude foreign matter from said anti-friction bearings, said cover plate having a portion spanning said baffle rings.

4. In a wheel and axle assembly, the combination of an axle, a wheel, anti-friction bearings disposed between said wheel and axle, said bearings having a race ring mounted on said axle, a shrink ring disposed adjacent to said race ring and having a plurality of baffle rings disposed thereon in spaced relation to each other, and a cover plate disposed between said wheel and axle and having a portion extending between said baffle rings.

5. In a single course roller bearing assembly, the combination of an inner and outer race ring, rollers disposed therebetween, one of said race rings having a curved bearing surface and the other of said race rings having the shape of a right frustum of a cone, the outer of said race rings having an outer thrust shoulder thereon.

6. In a roller bearing assembly, the combination of an inner and outer race ring, frusto-conical rollers disposed therebetween, one of said race rings having a curved bearing surface and the other of said race rings having the shape of a right frustum of a cone, the outer of said race rings having an outer thrust shoulder thereon.

7. In a roller bearing assembly, the combination of an inner and outer race ring, a single course of rollers disposed therebetween, the inner of said race rings having a compound curved bearing surface and the other of said race rings having the shape of a right frustum of a cone.

8. In a roller bearing assembly, the combination of an inner and outer race ring, rollers disposed therebetween, one of said race rings having a curved bearing surface and the other of said race rings having the shape of a right frustum of a cone, and cages for said rollers, said cages having an outside diameter substantially equal to the pitch diameter of said bearing assembly.

9. In a wheel and axle assembly, the combination of an outer rotary axle having an enlarged wheel hub portion and a bearing recess, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, a shrink ring mounted on said inner axle for positioning said anti-friction bearings, a cover plate mounted on said outer axle and extending toward said shrink ring, said shrink ring having baffle rings thereon embracing a portion of said cover plate whereby foreign matter is excluded from said anti-friction bearings, said anti-friction bearings including rollers having a frusto-conical main portion and a frusto-conical end portion, the axis of said rollers extending outwardly of the axis of the axles, inner and outer race rings, said outer race ring being disposed in said bearing recess and having a frusto-conical bearing surface, the inner race ring being disposed on the inner axle having a curved surface whereby when said assembly is unloaded the inner race ring and rollers contact at points, a guiding cup having a surface cooperating with the end portion of said rollers, and a cage cooperating with said rollers, the outside diameter of said cage being substantially equal to the pitch diameter of the bearing assembly.

10. In a railway wheel and axle assembly, the combination of an outer rotary axle having an enlarged wheel hub portion and a bearing recess, said hub portion being adapted to accommodate a railway flanged wheel, said axle having a lubricant recess communicating with said bearing recess and partially within said enlarged hub portion, an inner substantially non-rotatable axle extending through said outer axle and having a bearing portion thereon, anti-friction bearings mounted between said axles, and in said bearing recess, said bearings including an inner and outer race ring and frusto-conical rollers therebetween, one of said race rings having curved bearing elements, and the other having elements substantially those of a right frustum of a cone, a shrink ring mounted on said inner axle for positioning said anti-friction bearings, a cover plate mounted on said outer axle and extending toward said shrink ring, said shrink ring having baffle rings thereon embracing a portion of said cover plate whereby foreign matter is excluded from said anti-friction bearings.

11. In a railway wheel and axle assembly, the combination of an outer rotary axle having an enlarged wheel hub portion and a bearing recess, said hub portion being adapted to accommodate a railway flanged wheel, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, said bearings including an inner and outer race ring and frusto-conical rollers therebetween, one of said race-rings having curved bearing elements, and the other having elements substantially those of a right frustum of a cone, said rollers having a smaller frusto-conical thrust surface on one end thereof, one of said race rings having a thrust shoulder cooperating therewith, a shrink ring mounted on said inner axle for positioning said anti-friction bearings, a cover plate mounted on said outer axle and extending toward said shrink ring, said shrink ring having baffle rings thereon embracing a portion of said cover plate whereby foreign matter is excluded from said anti-friction bearings.

12. In a railway wheel and axle assembly, the combination of an outer rotary axle having an enlarged wheel hub portion and a bearing recess, said hub portion being adapted to accommodate a railway flanged wheel, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, said bearings including an inner and outer race ring and frusto-conical rollers therebetween, one of said race rings having curved bearing elements, and the other having elements substantially those of a right frustum of a cone, said rollers having a smaller frusto-conical thrust surface on the larger end thereof, one of said race rings having a thrust shoulder cooperating therewith, a shrink ring mounted on said inner axle for positioning said anti-friction bearings, a cover plate mounted on said outer axle and extending toward said shrink ring, said shrink ring having baffle rings thereon embracing a portion of said cover plate whereby foreign matter is excluded from said anti-friction bearings.

13. In a railway wheel and axle assembly, the combination of an outer rotary axle having an enlarged wheel hub portion and a bearing recess, said hub portion being adapted to accommodate a railway flanged wheel, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, said bearings including an inner and outer race ring and frusto-conical rollers therebetween, one of said race rings having curved bearing elements, and the other having elements substantially those of a right frustum of a cone, said rollers having a smaller frusto-conical thrust surface on the larger end thereof, the outer of said race rings having a thrust shoulder cooperating therewith, a shrink ring mounted on said inner axle for positioning said anti-friction bearings, a cover plate mounted on said outer axle and extending toward said shrink ring, said shrink ring having baffle rings thereon embracing a portion of said cover plate whereby foreign matter is excluded from said anti-friction bearings.

14. In a railway wheel and axle assembly, the combination of an outer rotary axle having an enlarged wheel hub portion and a bearing recess, said hub portion being adapted to accommodate a railway flanged wheel, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, said bearings including an inner and outer race ring and frusto-conical rollers therebetween, the inner of said race rings having curved bearing elements, and the other having elements substantially those of a right frustum of a cone, a shrink ring mounted on said inner axle for positioning said anti-friction bearings, a cover plate mounted on said outer axle and extending toward said shrink ring, said shrink ring having baffle rings thereon embracing a portion of said cover plate whereby foreign matter is excluded from said anti-friction bearings.

15. In a railway wheel and axle assembly, the combination of an outer rotary axle having an enlarged wheel hub portion and a bearing recess, said hub portion being adapted to accommodate a railway flanged wheel, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, said bearings including an inner and outer race ring and frusto-conical rollers therebetween, the inner of said race rings having curved bearing elements, and the other having elements substantially those of a right frustum of a cone, said rollers having a smaller frusto-conical thrust surface on the larger end thereof, and the outer of said race rings having a thrust shoulder cooperating therewith, a shrink ring mounted on said inner axle for positioning said anti-friction bearings, a cover plate mounted on said outer axle and extending toward said shrink ring, said shrink ring having baffle rings thereon embracing a portion of said cover plate whereby foreign matter is excluded from said anti-friction bearings.

16. In a roller bearing assembly, the combination of an inner and outer race ring, rollers disposed therebetween, the inner of said race rings having a compound curved bearing surface, and the other of said race rings having the shape of a right frustum of a cone, the outer of said race rings having an outer thrust shoulder thereon.

17. In a roller bearing assembly, the combination of an inner and outer race ring, a single course of rollers disposed therebetween, the inner of said race rings having a compound curved bearing surface and the other of said race rings having the shape of a right frustum of a cone, the outer of said race rings having an outer thrust shoulder thereon.

18. In a roller bearing assembly, the combination of an inner and outer race ring, a single course of rollers disposed therebetween, the inner of said race rings having a compound curved bearing surface and the other of said race rings having the shape of a right frustum of a cone, one of said race rings having a thrust shoulder thereon, and a cage for spacing said rollers, said cage having roller engaging means disposed substantially within the pitch diameter of said rollers.

19. In a roller bearing assembly, the combination of an inner and outer race ring, a single course of rollers disposed therebetween, the inner of said race rings having a compound curved bearing surface and the other of said race rings having the shape of a right frustum of a cone, one of said race rings having an outer thrust shoulder thereon.

20. In a roller bearing assembly, the combination of spaced race rings, a single course of rollers disposed therebetween, one of said rings having an arcuate bearing surface, the other of said rings having a bearing surface angularly disposed in relation to the axis of said rings, a thrust shoulder adjacent said last-named bearing surface cooperating with said rollers, and a cage for spacing said rollers, said cage having roller engaging means disposed substantially within the pitch diameter of said rollers.

21. In a roller bearing assembly, the combination of concentrically arranged and spaced race rings, rollers disposed therebetween, one of said rings having an arcuate bearing surface, the other of said rings having a bearing surface angularly disposed in relation to the axis of said rings, a thrust shoulder adjacent said last-named bearing surface, said rollers having a frusto-conical surface cooperating with said thrust shoulder, and a cage for spacing said rollers, said cage having roller engaging means disposed substantially within the pitch diameter of said rollers.

22. In a roller bearing assembly, the combination of concentrically arranged and spaced race rings, a single course of frusto-conical rollers disposed between said race rings, one of said rings having an arcuate bearing surface, the other of said rings having a bearing surface angularly disposed in relation to the axis of said rings, a thrust shoulder adjacent said last-named surface cooperating with said rollers, and a cage for spacing said rollers, said cage having roller engaging means disposed substantially within the pitch diameter of said rollers.

23. In a roller bearing assembly, the combination of concentrically arranged and spaced race rings, a single course of frusto-conical rollers disposed between said race rings, one of said rings having an arcuate bearing surface, the other of said rings having a bearing surface angularly disposed in relation to the axis of said rings, a thrust shoulder adjacent said last-named surface cooperating with said rollers, said rollers having a frusto-conical thrust surface cooperating with said thrust shoulder, and a cage for spacing said rollers, said cage having roller engaging means disposed substantially within the pitch diameter of said rollers.

24. In a roller bearing assembly, the combination of concentrically arranged and spaced race rings having bearing surfaces, rollers disposed between said rings and having rolling contact with said surfaces, the bearing surface of one of said rings being arcuate and so disposed that the end portions of said rollers are normally spaced at variable distances therefrom, and a cage for spacing said rollers, said cage having roller engaging means disposed substantially within the pitch diameter of said rollers.

25. In a roller bearing assembly, the combination of concentrically arranged and spaced race rings, rollers disposed therebetween, one of said rings having an arcuate bearing surface normally having point contact with said rollers, said arcuate surface being so disposed that the end portions of said rollers are at varying distances therefrom, and a cage for spacing said rollers, said cage having roller engaging means disposed substantially within the pitch-diameter of said rollers.

26. In a roller bearing assembly, the combination of concentrically arranged and spaced race rings, rollers disposed therebetween, one of said rings having an arcuate bearing surface normally having point contact with said rollers, said arcuate surface being so disposed that the end portions of said rollers are at varying distances therefrom, a thrust shoulder cooperating with said rollers, and a cage for spacing said rollers, said cage having roller engaging means disposed substantially within the pitch diameter of said rollers.

27. In a roller bearing assembly, the combination of concentrically arranged and spaced race rings, rollers disposed therebetween, one of said rings having an arcuate bearing surface normally having point contact with said rollers, said arcuate surface being so disposed that the end portions of said rollers are at varying distances therefrom, a thrust shoulder cooperating with said rollers, said rollers having a frusto-conical thrust surface, and a cage for spacing said rollers, said cage having roller engaging means disposed substantially within the pitch diameter of said rollers.

28. In a roller bearing assembly, the combination of concentrically arranged and spaced race rings, one of said race rings having an arcuate bearing surface, the other of said race rings having a plane bearing surface, rollers disposed between said race rings and having substantially a rolling point contact with said first-named bearing surface and substantially rolling line contact with said last-named bearing surface, the end portions of said rollers being normally disposed at variable distances from said arcuate bearing surface, and a cage for spacing said rollers, said cage having roller engaging means disposed substantially within the pitch diameter of said rollers.

29. In a roller bearing assembly, the combination of concentrically arranged and spaced race rings, one of said race rings having an arcuate bearing surface, the other of said race rings having a plane bearing surface, frusto-conical rollers disposed between said race rings and having substantially a rolling point contact with said first-named bearing surface and substantially rolling line contact with said last-named bearing surface, the end portions of said rollers being normally disposed at variable distances from said arcuate bearing surface, and a cage for spacing said rollers, said cage having roller engaging means disposed substantially within the pitch diameter of said rollers.

30. In a roller bearing assembly, the combination of concentrically arranged and spaced race rings, one of said race rings having an arcuate bearing surface, the other of said race rings having a plane bearing surface, frusto-conical rollers disposed between said race rings and having substantially a rolling point contact with said first-named bearing surface and substantially rolling line contact with said last-named bearing surface, the end portions of said rollers being normally disposed at variable distances from said arcuate bearing surface, a thrust shoulder cooperating with said rollers, and a cage for spacing said rollers, said cage having roller engaging means disposed substantially within the pitch diameter of said rollers.

31. In a roller bearing assembly, the combination of concentrically arranged and spaced race rings, one of said race rings having an arcuate bearing surface, the other of said race rings having a plane bearing surface, frusto-conical rollers disposed between said race rings and having substantially a rolling point contact with said first-named bearing surface and substantially rolling line contact with said last-named bearing surface, the end portions of said rollers being normally disposed at variable distances from said arcuate bearing surface, a thrust shoulder adjacent said plane bearing surface cooperating with said rollers, and a cage for spacing said rollers, said cage having roller engaging means disposed substantially within the pitch diameter of said rollers.

32. In a roller bearing assembly, the combination of concentrically arranged and spaced race rings, one of said race rings having an arcuate bearing surface, the other of said race rings having a plane bearing surface, frusto-conical rollers disposed between said race rings and having substantially a rolling point contact with said first-named bearing surface and substantially rolling line contact with said last-named bearing surface, the end portions of said rollers being normally disposed at variable distances from said arcuate bearing surface, a thrust shoulder for said rollers, said rollers having a frusto-conical thrust surface cooperating with said shoulder, and a cage for spacing said rollers, said cage having roller engaging means disposed substantially within the pitch diameter of said rollers.

33. In a roller bearing assembly, the combination of concentrically arranged and spaced race rings, one of said race rings having an arcuate bearing surface, the other of said race rings having a plane bearing surface, frusto-conical rollers disposed between said race rings and having substantially a rolling point contact with said first-named bearing surface and substantially rolling line contact with said last-named bearing surface, the end portions of said rollers being normally disposed at variable distances from said arcuate bearing surface, a thrust shoulder adjacent said plane bearing surface, said rollers having a frusto-conical thrust surface cooperating with said shoulder, and a cage for spacing said rollers, said cage having roller engaging means disposed substantially within the pitch diameter of said rollers.

34. In a wheel and axle assembly, the combination of an inner and outer axle, anti-friction bearings disposed between said axles, said bearings having a race ring mounted on said axle, a positioning member for said race ring, spaced projecting baffles on said member forming a groove, and a cover plate disposed between said axles and having a portion extending into said groove.

35. In a roller bearing assembly, the combination of concentrically arranged and spaced race rings, rollers therebetween, and a cage for said rollers, the outer diameter of said cage being substantially equal to the pitch diameter of the bearing assembly.

36. In a roller bearing assembly, the combination of concentrically arranged and spaced race rings, rollers therebetween, and a cage for said rollers, said cage being substantially uninterrupted frusto-conical in shape and having ridges between adjacent rollers disposed inside of the pitch circle of said rollers.

37. In a roller bearing assembly, the combination of concentrically arranged and spaced race rings, rollers therebetween, and a cage for said rollers, the outer diameter of said cage being substantially equal to the pitch diameter of the bearing assembly, said cage having ridges between adjacent rollers disposed inside of the pitch circle of said rollers.

38. In a roller bearing assembly, the combination of concentrically arranged and spaced race rings, rollers between and disposed in angular relation to the axis of said rings, and a cage for said rollers, all points on the outer surface of said cage coinciding substantially with the pitch diameter of said assembly at that point.

39. In a roller bearing assembly, the combination of concentrically arranged and spaced race rings, rollers between and disposed in angular relation to the axis of said rings, and a cage for said rollers, said cage having ridges between adjacent rollers disposed inside the pitch circle of said rollers, all points on the outer surface of said cage coinciding substantially with the pitch diameter of said assembly at that point.

40. In a roller bearing assembly, the combination of concentrically arranged and spaced race rings, frusto-conical shaped rollers between and disposed in angular relation to the axis of said rings, and a cage for said rollers, all points on the outer surface of said cage coinciding substantially with the pitch diameter of said assembly at that point.

41. In a roller bearing assembly, the combination of concentrically arranged and spaced race rings, frusto-conical shaped rollers between and disposed in angular relation to the axis of said rings, and a cage for said rollers, all points on the outer surface of said cage coinciding substantially with the pitch diameter of said assembly at that point, said cage having ridges between adjacent rollers having all points thereof disposed inside the pitch circle of said rollers at said points.

42. In a railway wheel and axle assembly, the combination of an outer rotary axle, an inner normally fixed axle, an anti-friction assembly between said axles, said assembly comprising an inner and outer race ring mounted on said axles, anti-friction rollers between and in rolling contact with said race rings, one of said race rings having a guide member adapted to guide said rollers and to take end thrust and the other of said race rings having a bearing surface permitting deflection of said inner axle, a shrink collar on said inner axle for positioning said anti-friction assembly, and a closure plate mounted on said outer axle and extending toward said shrink ring, said shrink ring having means cooperating with said cover plate for excluding foreign matter from said anti-friction bearings.

ALFRED H. OELKERS.